United States Patent
Jeong et al.

(10) Patent No.: US 10,869,271 B2
(45) Date of Patent: Dec. 15, 2020

(54) TERMINAL AND BASE STATION FOR CONTROLLING A CONNECTION STATE

(71) Applicant: Samsung Electronics Co., Ltd., Suwon-si (KR)

(72) Inventors: Sangsoo Jeong, Suwon-si (KR); Hyejeong Kim, Suwon-si (KR); Songyean Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 128 days.

(21) Appl. No.: 14/701,216

(22) Filed: Apr. 30, 2015

(65) Prior Publication Data

US 2015/0365997 A1 Dec. 17, 2015

(30) Foreign Application Priority Data

Jun. 16, 2014 (KR) .................. 10-2014-0073064
Jun. 27, 2014 (KR) .................. 10-2014-0079875

(51) Int. Cl.
*H04W 76/34* (2018.01)
*H04W 52/02* (2009.01)
*H04W 4/70* (2018.01)

(52) U.S. Cl.
CPC ... *H04W 52/0235* (2013.01); *H04W 52/0251* (2013.01); *H04W 76/34* (2018.02); *H04W 4/70* (2018.02); *Y02D 30/70* (2020.08)

(58) Field of Classification Search
CPC ......... H04W 52/0235; H04W 52/0251; H04W 52/0254; H04W 76/064; H04W 76/27;
(Continued)

(56) References Cited

U.S. PATENT DOCUMENTS

2008/0253312 A1   10/2008   Park
2011/0269463 A1   11/2011   Wang et al.
(Continued)

FOREIGN PATENT DOCUMENTS

CN   101426278 A   5/2009
CN   102870145 A   1/2013
(Continued)

OTHER PUBLICATIONS

"3rd Generation Partnership Project; Technical Specification Group Radio Access Network; User Equipment (UE) Conformance Specification; Part 1: Protocol Conformance Specification (Release 11)," 3GPP TS 34.123-1, V11.2.0, Mar. 28, 2014, pp. 1371-1384.

(Continued)

*Primary Examiner* — Harun Chowdhury
(74) *Attorney, Agent, or Firm* — Jefferson IP Law, LLP

(57) ABSTRACT

A method and apparatus for controlling the connection state of the UE is provided to minimize battery power consumption. A connection state control method of a terminal in a wireless communication system according to the present invention includes monitoring traffic transmission/reception condition associated with at least one application running on the terminal, determining whether traffic transmission/reception for the terminal is likely to occur based on the monitoring result, and transmitting, when no traffic transmission/reception for the terminal occurs, a Signaling Connection Release Indication (SCRI) message to a base station.

11 Claims, 9 Drawing Sheets

(58) Field of Classification Search
CPC ............. H04W 76/34; H04W 52/0212; H04W 52/0216; H04W 52/0258; Y02D 70/24
USPC ...... 370/230, 252, 311, 329, 328; 455/422.1
See application file for complete search history.

(56) References Cited

U.S. PATENT DOCUMENTS

| | | |
|---|---|---|
| 2012/0020393 A1 | 1/2012 | Patil et al. |
| 2012/0264416 A1* | 10/2012 | Pica ................. H04W 52/0254 455/422.1 |
| 2012/0281561 A1 | 11/2012 | Shukla et al. |
| 2012/0322515 A1 | 12/2012 | Hwang et al. |
| 2013/0109368 A1 | 5/2013 | Hellander |
| 2013/0235780 A1* | 9/2013 | Kim ................. H04W 52/0235 370/311 |
| 2013/0265922 A1 | 10/2013 | Chakravarthy et al. |
| 2013/0267213 A1 | 10/2013 | Hsu |
| 2014/0143573 A1 | 5/2014 | Ishihara et al. |
| 2014/0233459 A1* | 8/2014 | Dahod ................. H04W 76/27 370/328 |

FOREIGN PATENT DOCUMENTS

| | | |
|---|---|---|
| CN | 103026779 A | 4/2013 |
| CN | 103229585 A | 7/2013 |
| EP | 1981224 A1 | 10/2008 |
| EP | 2384081 A2 | 11/2011 |
| WO | 2012-074451 A1 | 6/2012 |

OTHER PUBLICATIONS

Chinese Office Action dated Sep. 4, 2019, issued in Chinese Application No. 201510217419.7.

* cited by examiner

TERMINAL AND BASE STATION FOR CONTROLLING A CONNECTION STATE

PRIORITY

This application claims priority under 35 U.S.C. 119(a) to applications filed in the Korean Intellectual Property Office on Jun. 16, 2014 and Jun. 27, 2014, and assigned Serial Nos. 10-2014-0073064 and 10-2014-0079875, respectively, the contents of which are incorporated herein by reference.

TECHNICAL FIELD

The present invention relates to a terminal and a base station for controlling a connection state and, in particular, to an apparatus for controlling the connection state of the UE to minimize battery power consumption.

BACKGROUND

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

With the advent of smartphones, various types of user application services are provided. As the smartphone is used for various purposes, it becomes more important to control power consumption efficiently to increases the battery use time.

Meanwhile, in the case of Internet of Things (IoT) and Machine Type Communication (MTC) terminals that are mostly used in the purpose of sensing or tracking, once the battery is mounted, it is difficult to charge or replace the battery. For such devices, there is a need of using the battery efficiently to elongate the device operation time without involvement of the operator.

In the devices having the communication function such as smartphone and MTC terminal, the communication module occupies the most part of the power consumption. Particularly, the communication module consumes large amount of power especially when transmitting and receiving data to and from the base station. If a UE generates data in a regular manner and thus has a predictable idle period or if the UE does not need communicating data for a long time, it is possible for the UE to enter a low power consumption mode to conserve the battery power.

SUMMARY

The present invention aims to provide an apparatus for controlling the communication module efficiently to reduce battery power consumption of the communication terminal such as smartphone and MTC terminal.

In accordance with another aspect of the present invention, a terminal for controlling a connection state in a wireless communication system is provided. The terminal includes a communication unit configured to transmit and receive signals to and from a base station and a control unit configured to monitor traffic transmission/reception condition associated with at least one application running on the terminal, configured to determine whether traffic transmission/reception for the terminal is likely to occur based on the monitoring result, and configured to control, when no traffic transmission/reception for the terminal occurs, the communication unit to transmit a Signaling Connection Release Indication (SCRI) message to a base station.

The control unit is configured to check a traffic transmission/reception pattern based on the traffic transmission/reception condition associated with the at least one application and configured to determine whether traffic transmission/reception for the terminal is likely to occur based on the traffic transmission/reception pattern.

The control unit may be configured to determine, when traffic end indication information is detected, that traffic transmission/reception for the terminal is unlikely to occur.

In an embodiment, the control unit may be configured to determine, when traffic end indication information is detected and no traffic transmission/reception occurs for predetermined duration, that traffic transmission/reception for the terminal is unlikely to occur.

The control unit may be configured to determine, when traffic end indication information and traffic transmission/reception occurrence information are detected, that traffic transmission/reception for the terminal is unlikely to occur.

The traffic occurrence-related information may comprise at least one of expectation information on time duration between last traffic transmission/reception and next traffic transmission/reception and a level information of time before the next traffic transmission/reception.

The control unit may be configured to control the communication unit to receive a message for transitioning state of the terminal from the base station and transitions the state of the terminal based on the received message.

The control unit may be configured to determine whether a T323 timer is received from the base station and controls the communication unit to transmit, when the T323 timer is received, the SCRI message to the base station.

The connected state of the terminal comprises at least one of a User Equipment (UE) idle mode, a Radio Resource Control (RRC) connected mode, a CELL_PCH state, a CELL_FACH state, and a CELL_DCH state.

In accordance with still another aspect of the present invention, a base station for controlling a connection state of a terminal in a wireless communication system is provided. The base station includes a communication unit configured to transmit and receive signals to and from a terminal and a control unit configured to control the communication unit to receive a Signaling Connection Release Indication (SCRI) message including traffic occurrence-related information, configured to determine whether state transition is necessary for the terminal based on the traffic occurrence-related information, configured to generate, when state transition is necessary, a control message for transiting the state of the terminal, and configured to control the communication unit to transmit the control message to the terminal.

The state of the terminal comprises at least one of a User Equipment (UE) idle mode, a Radio Resource Control (RRC) connected mode, a CELL_PCH state, a CELL_FACH state, and a CELL_DCH state.

The control unit may be configured to determine, when the traffic occurrence-related information is equal to or greater than a first threshold value, to transition the state of the terminal to UE idle mode.

In an embodiment, the control unit may be configured to determine, when the traffic occurrence-related information is less than the first threshold value, to transition the state of the terminal to one of CELL_PCH and CELL_FACH.

In accordance with another aspect of the present invention, a connection state control method of a terminal in a wireless communication system is provided. The method includes the steps of executed on the terminal, determining whether a predetermined event is detected based on the monitoring result, and transmitting a signaling connection release indication (SCRI) message to the base station if the predetermined event is detected.

In accordance with another aspect of the present invention, a method for a base station to control connected states of a terminal in a wireless communication system is provided. The method includes the steps of receive a signaling connection release indication (SCRI) message including traffic occurrence-related information, determining whether a state transition is necessary for the terminal based on the traffic occurrence-related information, generating a control message for transiting the state of the terminal if a state transition is necessary, and transmitting the control message to the terminal.

Throughout the invention, the step of determining whether traffic transmission/reception for the terminal is likely to occur may comprise determining a traffic-occurrence probability.

DETAILED DESCRIPTION

Figure 1:
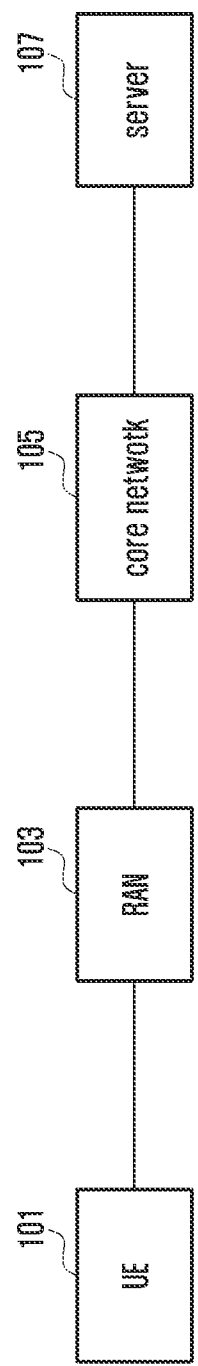
FIG. 1 is a schematic diagram illustrating a structure of a wireless communication system.

Exemplary embodiments of the present invention are described with reference to the accompanying drawings in detail.

Detailed description of well-known functions and structures incorporated herein may be omitted to avoid obscuring the subject matter of the present invention. This aims to omit unnecessary description so as to make the subject matter of the present invention clear.

The terms used herein are for the purpose of describing particular embodiments only and is not intended to be limiting the invention but may be replaced with others without departing from the scope of the present invention as set forth in the claims.

For the same reason, some of elements are exaggerated, omitted or simplified in the drawings and, in practice, the elements may have sizes and/or shapes different from those shown in drawings.

Advantages and features of the present invention may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatuses to produce a machine, such that the instructions, which execute via the processor of the computer or other programmable data processing apparatuses, create means for implementing the functions/acts specified in the flowchart and/or block diagram block or blocks. These computer program instructions may also be stored in a computer-readable memory that can direct a computer or other programmable data processing apparatuses to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatuses to cause a series of operational steps to be performed on the computer or other programmable apparatuses to produce a computer implemented process such that the instructions which are executable on the computer or other programmable apparatuses provide steps for implementing the functions/acts specified in the flowchart and/or block or blocks specified in the block diagram.

Furthermore, the respective block diagrams may illustrate parts of modules, segments or codes including at least one or more executable instructions for performing specific logic function(s). Moreover, it should be noted that the functions of the blocks may be performed in different order in several modifications. For example, two successive blocks may be performed substantially at the same time, or may be performed in reverse order according to their functions. Wherever a specific functionality of a device is described or referred to, it should be understood that the related device is configured to provide this functionality.

The term "module" according to the embodiments of the invention, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and may be configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they are executable by one or more central processing units (CPUs) in a device or a secure multimedia card.

The same reference numbers are used throughout the drawings to refer to the same or like parts.

Although the description is directed to embodiments according the 3GPP UTRAN/GPRS standards (UTRAN: Universal Terrestrial Radio Access Network; GPRS: General Packet Radio Service), it will be understood by those skilled in the art that the present invention can be applied even to other communication systems, e.g. GERAN (GSM EDGE Radio Access Network) and LTE (Long Term Evolution) system, having the similar technical background and channel format, with a slight modification, without departing from scope of the present invention as set forth in the claims.

In the specification and drawings, the term '3G network' is used in the same meaning as 'UTRAN.' In the specification and drawings, the communication module may correspond to the Radio Resource Control (RRC) layer or Non-Access Stratum (NAS) module abiding by the 3GPP standard. Although the timer for use in RRC connection control is called T323 in the following description, the present invention is not limited by the name of timer but can be carried out with various timers with different names. Although the counter or variable for use in the RRC connection control is called V316 in the following description, the present invention is not limited by the name of the counter/variable but can be carried out with various counters/variables with different names.

In the following description, the expression "be in a network" is used to specify the state of being connected, being in Forward Access Channel (FACH) state, being in Paging Channel (PCH) state, being camped on in the idle state, etc. In the following description, the term 'base station' may be used in the meaning including a base station control node, such as a radio network controller (RNC) in UTRAN, an evolved nodeB (eNB) in E-UTRAN, and a base station controller (BSC) in GERAN.

FIG. 1 is a schematic diagram illustrating a structure of a wireless communication system.

The User Equipment (UE) 101 (interchangeably referred to as terminal) connects to the Radio Access Network (RAN) 103 (interchangeably referred to as base station) through the air interface for data communication. In the case of the 3G network, the RAN correspond to UTRAN and, in this case, the UE connects to the node B through the air channel which is controlled by the RNC. The node B and RNC may be implemented as one entity physically.

The RAN 103 connects to the core network 105 and, in the case of the 3G network, the core network 105 may be composed of a serving GPRS support node (SGSN) and a gateway GPRS support node (GGSN) in the Packet Switched (PS) domain and a mobile services switching center (MSC) in the Circuit Switched (CS) domain.

There may be various servers 107 connected outside the operator network. That is, the UE 101 may connect to various servers 107, via the operator network comprised of the RAN 103 and the core network 105, for data communication. The various services may include the network entities providing $3^{rd}$ Party operator services such as the network entity providing the voice call service and Short Messaging Service (SMS).

The UE 101 may connect to the RAN 103 for data communication. The connection mode between the UE 101 and the RAN 103 is referred to as Radio Resource Control (RRC) connection state (RRC state). The connection state may be classified into one of the following modes:

UE idle mode
RRC connected mode
The RRC connected mode can be sub-classified into following modes:
CELL_PCH (or URA_PCH)
CELL_FACH state
CELL_DCH state
In the UMTS air interface, the RRC connection state of the UE includes various active states including Cell_DCH, Cell_FACH, Cell_PCH (or URA_PCH), and idle mode. In the Cell_DCH (Dedicated Transport Channel) mode, the UE is allocated a dedicated physical channel for uplink and downlink transmission.

In the Cell_FACH (Forward Access Channel) mode, no dedicated physical channel is allocated to the UE. In this case, the UE monitors the FACH in downlink transmission. The UE is allocated a default common or shared transport channel which can be used always in the process of connecting to the corresponding transport channel.

In the Cell_PCH (Paging Channel) mode, no dedicated physical channel is allocated and no uplink transmission is allowed. The UTRAN may be notified of the UE location through the cell level according to the cell with which the UE has performed the cell update procedure last. Likewise, in the UTRAN registration area (URA_PCH mode), no dedicated physical channel is allocated and no uplink transmission is allowed. The UE location can be acquired through the UTRAN registration area by URA allocated to the UE in the URA update procedure performed last.

Typically, the RRC connected mode is more power consumptive than the UE idle mode and, in the RRC connected mode, the Cell_DCH mode consumes more power than the Cell_FACH or Cell_PCH mode (or URA_PCH mode). Typically, the Cell_FACH mode consumes more power than the Cell_PCH mode (or URA_PCH mode). Meanwhile, when data occurs, there is no need for the UE to establish an RRC connection in the RRC connected mode since the UE is already connected, but the UE in the idle mode needs to establish an RRC connection prior to data communication.

The present invention proposes a UE and base station functionality of reducing battery power consumption of the UE and improving the usability of the operator network by determining the connected mode and detailed connection state in consideration of the traffic characteristic of the UE. In detail, if the subsequent data traffic occurrence probability is low after completing data communication of the UE, the UE notifies the base station control node to transit to a connection state of less power consumption to minimize battery power consumption.

Figure 2:
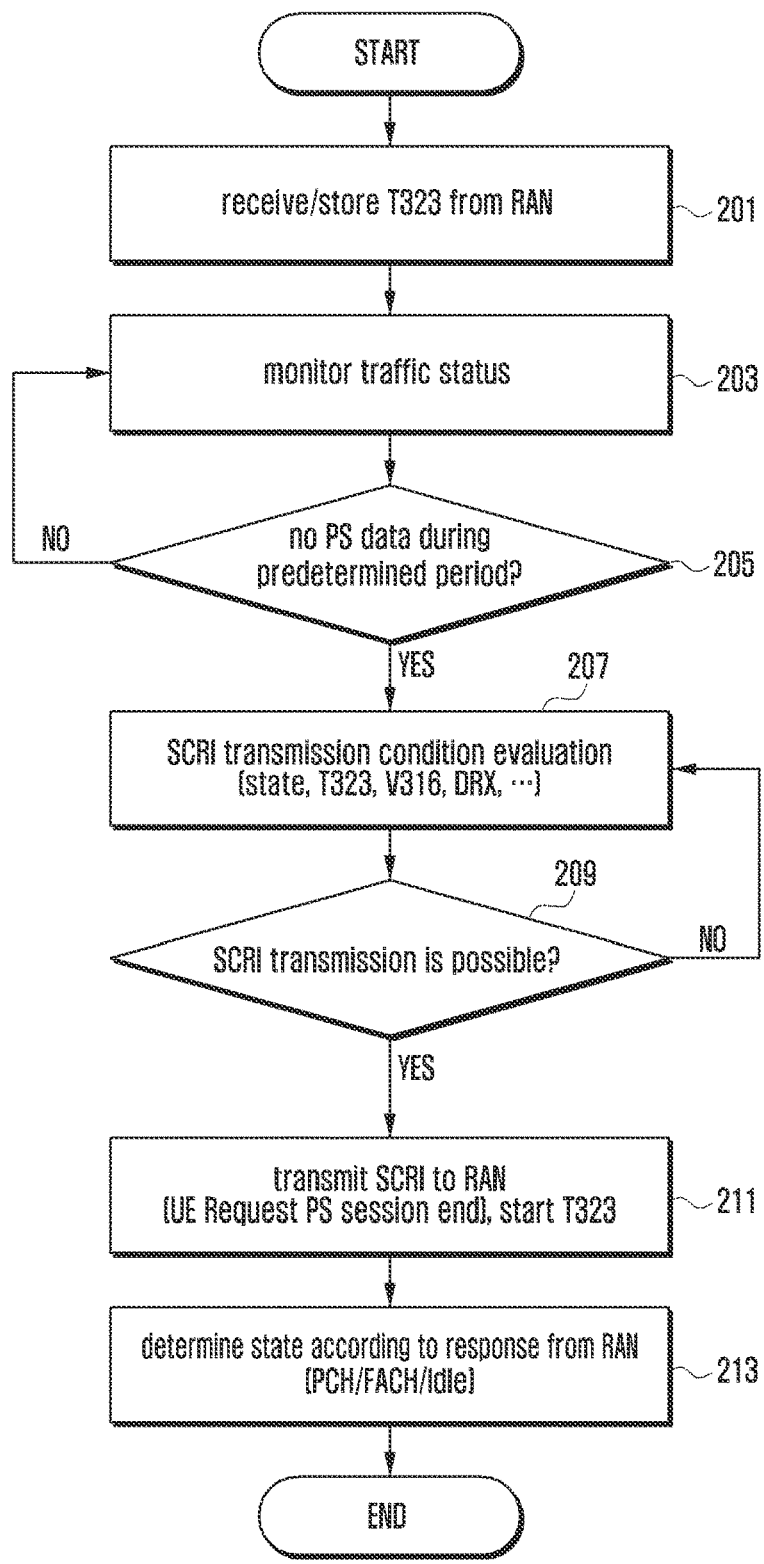
FIG. 2 is a flowchart illustrating a functionality implemented in the UE for operation mode control of the UE according to an embodiment of the present invention.

FIG. 2 is a flowchart illustrating the operation mode control procedure of the UE according to an embodiment of the present invention.

Referring to FIG. 2, the UE receives an RRC message including T323 from the RAN and stores the T323 at step 201. After receiving the T323, if no PS data occurs for the UE during a predetermined time period in the operator network, this means that a Signaling Connection Release Indication (SCRI) message delivery is allowed.

The UE monitors the PS data traffic at step 203 and determines whether no PS data occur during a predetermined period at step 205. The determination may be made by the communication module or when a notification is received from the higher layer.

If the condition is fulfilled, the UE evaluates at least one condition for determining whether it is possible to transmit SCRI message at step 207. That is, the UE may determine its current operating state (CELL_DCH, CELL_FACH, and CELL_PCH/URA_PCH), presence/absence of connection to the CS domain, discontinuous reception (DRX) configuration parameter, whether T323 is running or not, and/or whether V316 is less than 1.

The UE determines whether it is possible to transmit the SCRI message to the RAN at step 209. That is, the UE determines the SCRI message transmission possibility based on the SCRI transmission conditions evaluated at step 207. If the SCRI message transmission condition is not fulfilled, the procedure returns to step 207 to continue evaluating the SCRI message transmission condition. If the SCRI message transmission condition is not fulfilled, the UE may return the procedure to step 203 to monitor the traffic.

If it is determined that the SCRI message transmission is possible, the UE transmits the SCRI message including the CN Domain Identity set to 'PS domain' and the SCRI Cause set to 'UE Requested PS Data Session end' to the RAN and starts the timer T323 at step 211. While T323 is running, the UE may be inhibited from sending a further SCRI message with the above cause.

Next, if the RAN transmits a message for changing the connection status or RRC connection mode, the UE shifts, at step 213, from the RRC connected mode to the UE idle mode or changes the RRC connected mode. Alternatively, The UE may transit the state of the UE after transmitting the SCRI message.

Figure 3:
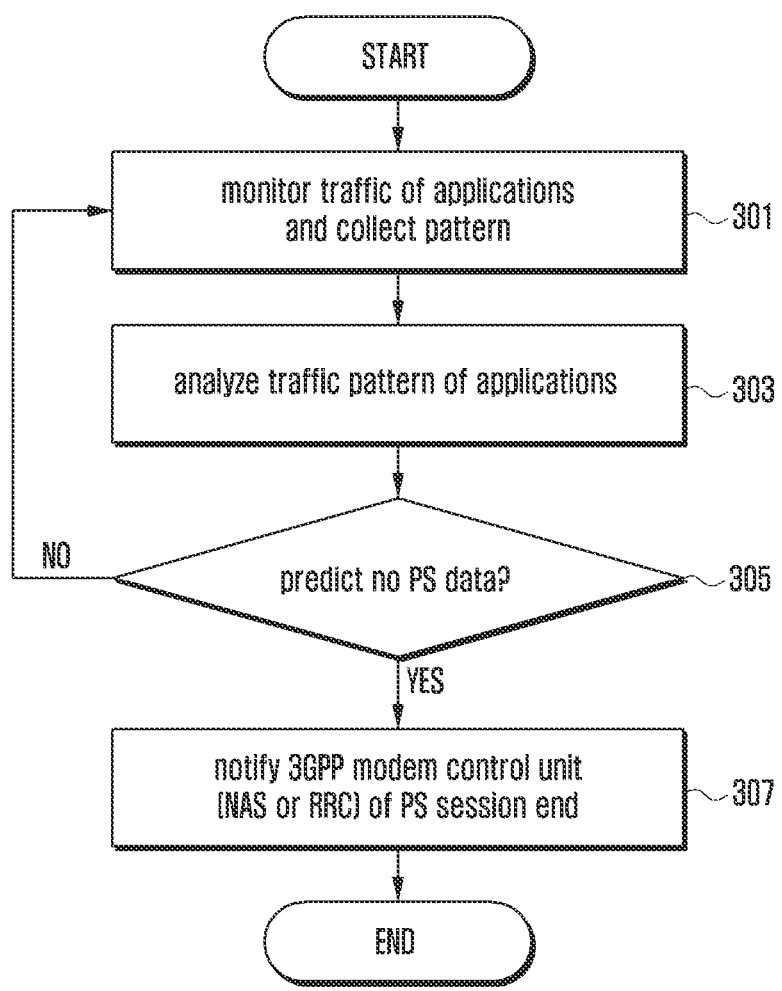
FIG. 3 is a flowchart illustrating a functionality implemented in the UE for traffic pattern-based operation of the UE according to an embodiment of the present invention.

FIG. 3 is a flowchart illustrating a traffic pattern-based operation of the UE according to an embodiment of the present invention.

Referring to FIG. 3, the traffic monitoring module (interchangeably referred to as traffic monitoring unit) of the UE monitors the traffic of an application running on the UE and analyzes the monitoring result to check the traffic pattern at step 301. The traffic monitoring module is implemented in software or hardware as a component of the UE and, although named as traffic monitoring module, it can be a part of another software or hardware component of the UE, e.g. a controller, a traffic analyzer, and a connection manager. Although the description is directed to the operation of an application for explanation convenience, the operation and subject matter of the present invention is applicable to all the types of logical components generating and receiving data traffic such as service, activity, process, and thread.

The traffic monitoring module of the UE analyzes to check a presence of PS data based on the collected pattern at step 303. Suppose that the UE generates a first traffic associated with a first application at a first time, a second traffic associated with a second application at a second time, and a third traffic associated with a third application at a third time, periodically. Suppose that the first to third traffics are transmitted to the RAN at the third time. In this case, the traffic monitoring module of the UE may analyze the pattern information of the traffic occurring periodically at the first to third times and predict that no traffic will occur for a predetermined duration based on the pattern information.

If it is predicted that no further traffic occurs as a result of the traffic pattern analysis at step 305, the traffic monitoring module sends the communication control module (component identical with the 3GPP modem controller in the drawing) the information notifying of no more data or data session end at step 307. Although the module which receives the no more data or data session end information is described with the name of 'communication control module, it is obvious that a communication unit or a control unit controlling the operation of the communication unit can process the corresponding information.

In order to determine that there is no more traffic, the UE may start a timer at a time when the last data is transmitted/received and, if there is no more data traffic occurring before the expiry of the timer, predict that no more traffic occurs.

If the expectation value of the duration between the last data transmission/reception and the next data transmission/reception (i.e. inter-arrival time of data) is greater than a predetermined threshold value, the UE predicts that no more traffic occurs. Although the description is directed to the case of using the expectation value of the duration between the last data transmission/reception and the next data transmission/reception, the prediction of no more traffic can be made based on the duration between the last data transmission/reception and the next data transmission/reception in itself.

Meanwhile, the traffic monitoring module may check an inactivity level of the current UE in the middle of analyzing the traffic pattern. For example, the high value of the inactivity level indicates that the traffic occurrence probability after the last traffic transmission is low, and the low value of the inactivity level indicates that the traffic occurrence probability after the last traffic transmission is high. It is also possible to check the inactivity level using the time expectation to the time until the next traffic occurs since the last traffic transmission of the UE. That is, the inactivity level is high when the time expectation is long and low when the time expectation is short. As described above, the traffic monitoring module may send the communication control module the information for use in checking the inactivity level or the expectation value of the duration value for the next traffic arrival along with the information of indicating no more data traffic.

Here, the expectation value of the duration between the last traffic transmission/reception and the next traffic transmission/reception and the expectation value of the duration until the occurrence of the next traffic transmission/reception are referred to as traffic occurrence-related information.

In order to exchange the information between the traffic monitoring module and the communication control module, it can be considered to use a method of generating Inter Processing Communication (IPC) or transferring the information as parameter while a module (e.g. traffic monitoring module) calls an Application Program Interface provided by another module (e.g. communication control module).

If it is expected that PS data occurs based on a result of the traffic transmission pattern analysis at step 305, the traffic monitoring module returns the procedure to step 301 to monitor the traffic of the applications and collect traffic patterns.

If the information notifying of no more traffic is to be received, the communication control module performs the operation at step 307 of FIG. 3

Figure 4:
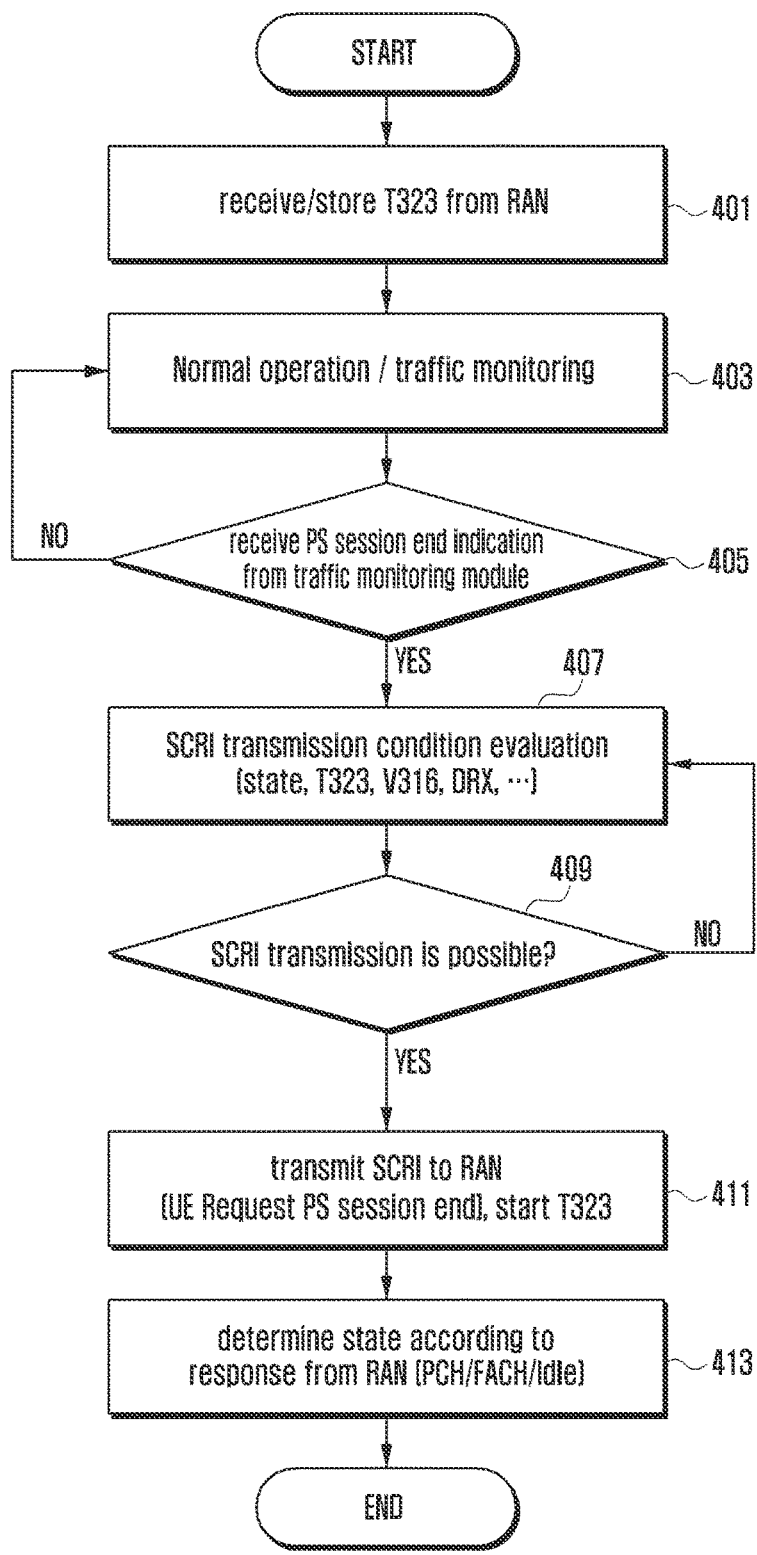
FIG. 4 is a flowchart illustrating a functionality implemented in the UE for determining whether to transmit SCRI based on the traffic pattern analysis according to an embodiment of the present invention.

FIG. 4 is a flowchart illustrating the UE operation procedure for determining whether to transmit SCRI based on the traffic pattern analysis according to an embodiment of the present invention.

Referring to FIG. 4, the communication control module of the UE receives an RRC message from the RAN and stores the T323 included in the RRC message at step 401. After receiving the T323, if no PS data occurs for the UE during a predetermined time period in the operator network, the communication control module determines that a Signaling Connection Release Indication (SCRI) message can be transmitted.

The communication control module of the UE determines whether a no more data or data session end indicator is received from the traffic monitoring module at step 405. If the information indicating the no more data or data session end (e.g. PS session end indication or traffic end indication) is not received, the communication module may perform the normal operation at step 403. The traffic monitoring module generates the information to the communication control module as described in the embodiment of FIG. 3. If the information is received, the communication control module of the UE evaluates, at step 407, at least one condition to determine whether the SCRI message transmission is possible. That is, the communication control module may determine its current operating state (CELL_DCH, CELL_FACH, and CELL_PCH/URA_PCH), presence/absence of connection to the CS domain, DRX configuration parameter, whether T323 is running or not, and/or whether V316 is less than 1.

The communication control module determines, at step 409, whether it is possible to transmit the SCRI message to the RAN. If it is possible to transmit the SCRI message, the communication control module of the UE transmits the SCRI message to the RAN including the CN Domain Identity set to 'PS domain' and the SCRI Cause set to 'UE Requested PS Data Session end' and starts the T323 at step 411.

Next, if the network transmits a message for changing the connected mode or RRC connection state, the UE shifts from the connected mode to the idle mode or changes the RRC connection state at step 413.

If it is restrictive for the traffic monitoring module to monitor traffic (i.e. some part, but not the whole, of the traffic transmitted/received is allowed for monitoring), it may be inefficient to shift the operation mode or change the RRC connection state based on the partial traffic pattern.

Figure 5:
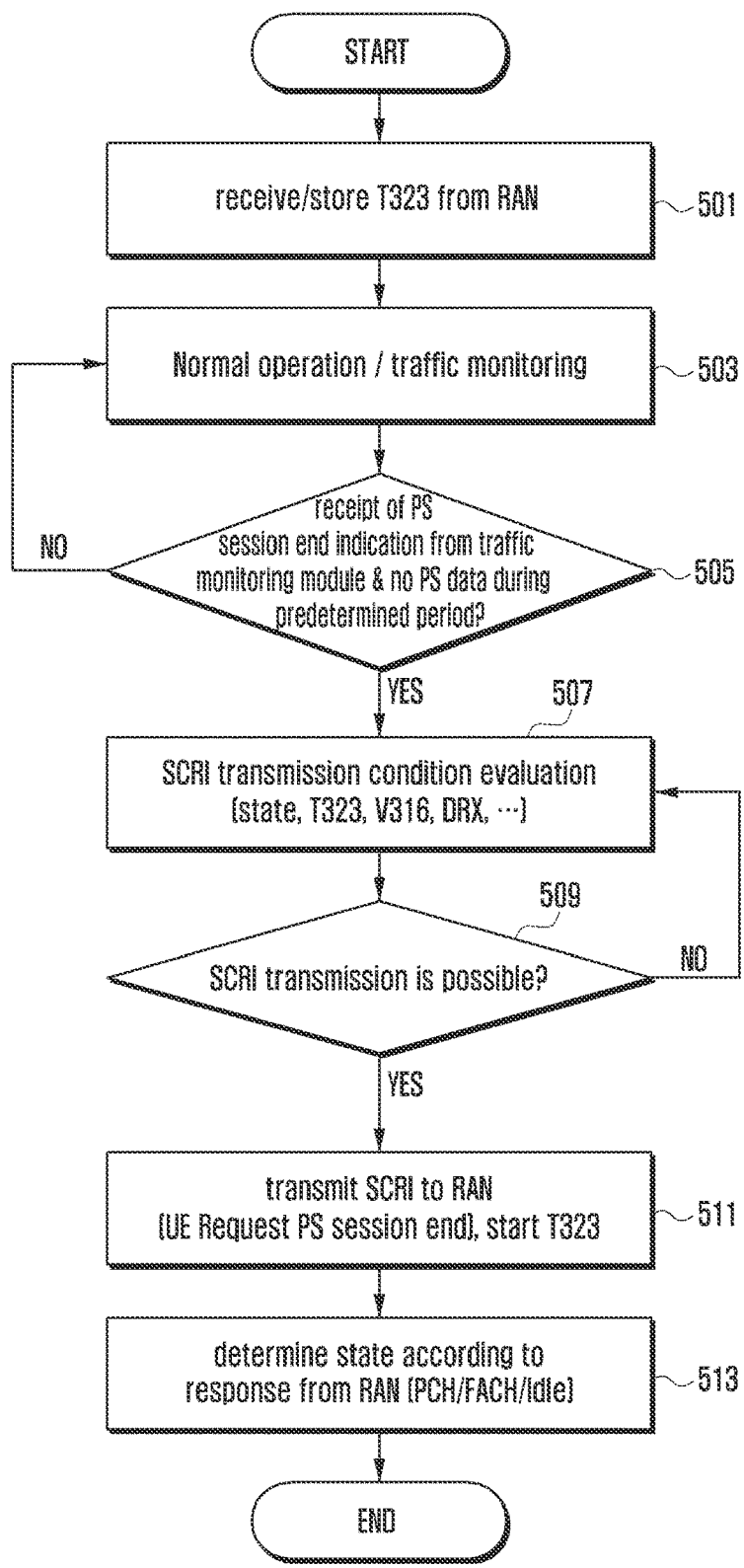
FIG. 5 is a flowchart illustrating a functionality of the UE for operation in consideration of the traffic pattern collected by the traffic monitoring module and other traffic situation according to an embodiment of the present invention.

FIG. 5 is a flowchart illustrating a UE operation procedure in consideration of the traffic pattern collected by the traffic monitoring module and other traffic situation according to an embodiment of the present invention.

Since the operation of the UE in FIG. 5 is identical with the operation of the UE in FIG. 4 with the exception of step 505, the description is focused on the operation of the UE at step 505. The communication control module of the UE determines whether a no more data or data session end indicator is received from the traffic monitoring module at step 505. The traffic monitoring module can generate the above information to the communication control module as described in the embodiment of FIG. 3. The communication control module may monitor to detect whether any traffic occurs before the expiry of a predetermined timer since the last data transmission/reception. If the above information is received from the traffic monitoring module and no traffic occurs during a predetermined period, the communication control module of the UE determines whether it is possible to transmit the SCRI message to the RAN. At this time, the communication control module checks its current operating state (CELL_DCH, CELL_FACH, and CELL_PCH/URA_PCH), presence/absence of connection to the CS domain, DRX configuration parameter, where T323 is running or not, and whether V316 is less than 1.

Steps 507, 509, 511 and 513 of FIG. 5 are identical with steps 407, 409, 411 and 413 of FIG. 4.

Figure 6:
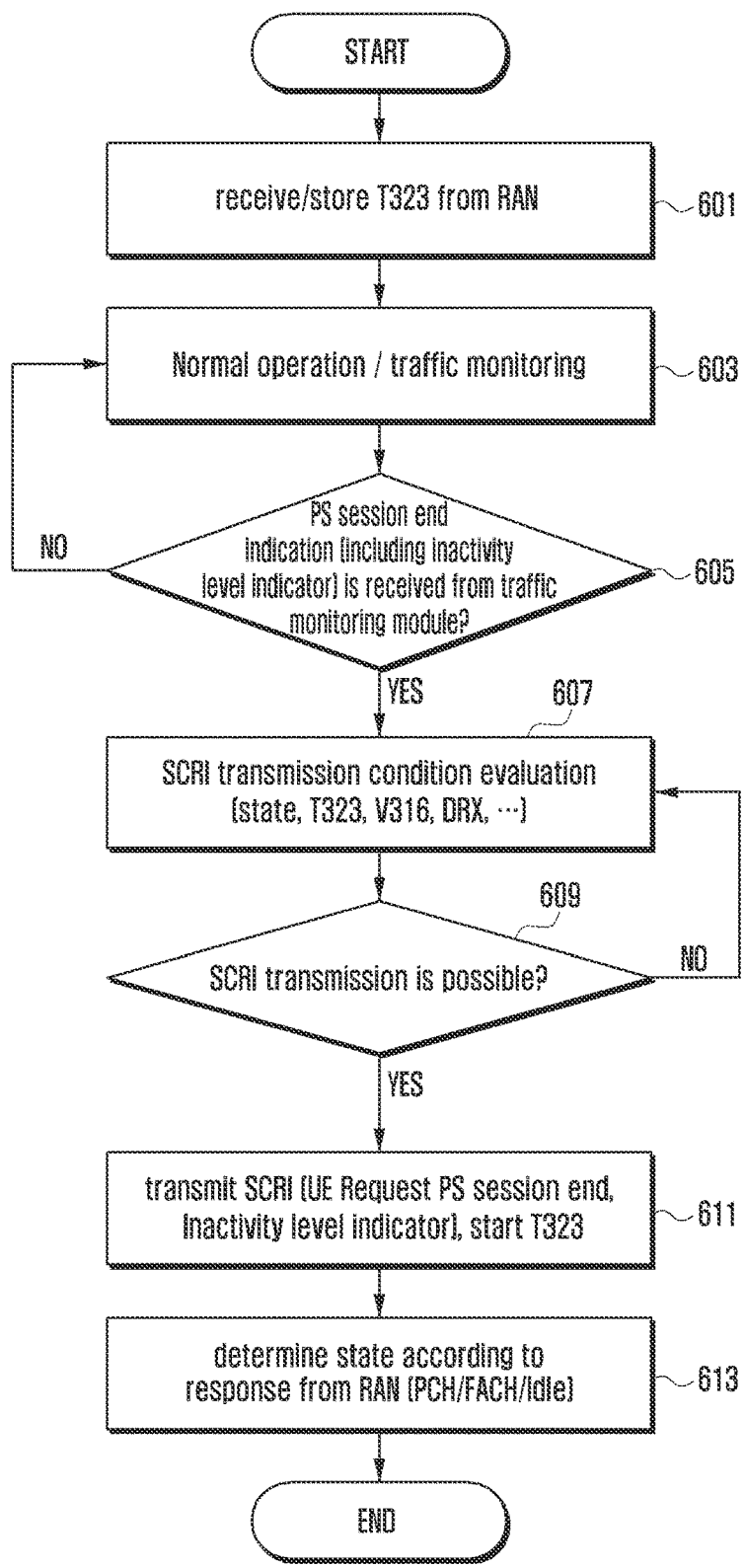
FIG. 6 is a flowchart illustrating an RRC connection state transition functionality in such a way that the UE provides the RAN with the traffic pattern information as implemented in the UE according to an embodiment of the present invention.

FIG. 6 is a flowchart illustrating a RRC connection state transition functionality implemented in the UE according to the invention, wherein the UE provides the RAN with the traffic pattern information according to an embodiment of the present invention.

Referring to FIG. 6, the communication control module of the UE receives an RRC message from the RAN and stores the T323 included in the RRC message at step 601. After receiving the T323, if no PS data occurs for the UE during a predetermined time period in the operator network, the communication control module determines that a Signaling Connection Release Indication (SCRI) message can be transmitted.

The communication control module of the UE determines whether a no more data or data session end indicator is received from the traffic monitoring module at step 605.

If the no more data or data session end indicator is not received, the communication module may perform the normal operation at step 603.

At step 605, the traffic monitoring module generates the information to the communication control module as described in the embodiment of FIG. 3. The information for use in checking the inactivity level of the UE or the information on the time expectation value to the next traffic occurrence may be received along with the no more traffic indication information.

If the above information is received, the communication control module of the UE evaluates, at step 607, at least one condition to determine whether the SCRI message transmission is possible. That is, the communication control module may determine its current operating state (CELL_DCH, CELL_FACH, and CELL_PCH/URA_PCH), presence/absence of connection to the CS domain, DRX configuration parameter, where T323 is running or not, and whether V316 is less than 1.

The UE determines, at step 609, whether it is possible to transmit the SCRI message to the RAN. If it is possible to transmit the SCRI message, the communication control module of the UE transmits the SCRI message to the RAN including the CN Domain Identity set to 'PS domain' and the SCRI Cause set to 'UE Requested PS Data Session end' and starts the T323 at step 611. If the information capable of checking the inactivity level of the UE or the information on the expectation time to the next traffic occurrence is received along with the no more traffic indication information, the communication control module of the UE may transmit the SCRI message including the above information. The communication control module also starts the T323.

In an alternative embodiment, if the SCRI message can be transmitted, the communication control module of the UE sends the RAN the SCRI message including the CN Domain Identity being set to 'PS domain' and the SCRI cause set to the information capable of checking the inactivity level of the UE or the information on the expectation time to the next traffic occurrence. The communication control module also starts the T323.

Next, if the RAN transmits a message for changing the connection status or RRC connection mode, the UE shifts from the RRC connected mode to the UE idle mode or changes the RRC connected mode at step 613.

Figure 7:
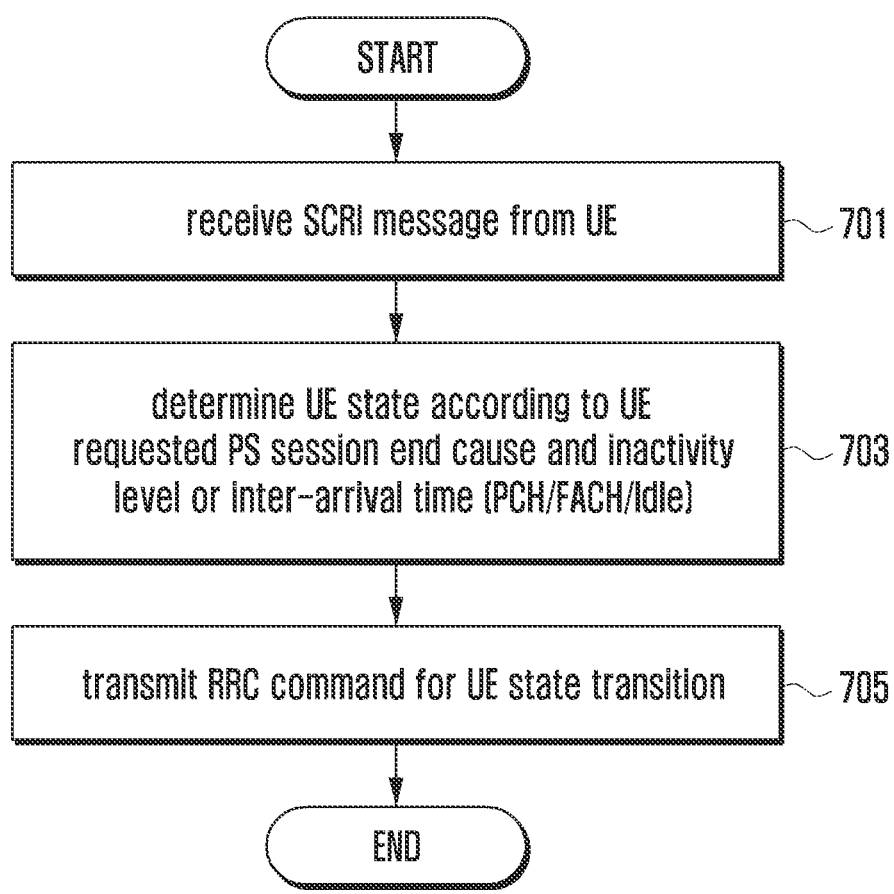
FIG. 7 is a flowchart illustrating a functionality implemented in a base station according to an embodiment of the present invention.

FIG. 7 is a flowchart illustrating the operation procedure of the RAN which has received the SCRI message from the UE according to an embodiment of the present invention.

The RAN receives the SCRI message from the UE at step 701.

If the received SCRI message includes a UE requested PS session end cause, the RAN determines that there is no traffic occurring for the UE for the time being and performs, at step 703, the operation of transmitting an RRC command for transitioning the UE to an RRC connection state (CELL_FACH, CELL_PCH/URA_PCH, or UE idle mode) consuming less power than the CELL_DCH state.

If the SCRI message transmitted by the UE includes the traffic occurrence-related information (e.g. the information capable of checking the inactivity level of the UE or the information indicating the expectation time to the next traffic occurrence) (as described above, this information may be received in an IE other the IE requested PS session end cause or in the form of a value indicating the cause), the RAN may consider the inactivity level or the expectation time to the next traffic occurrence when transitioning the RRC state from the CELL_DCH to another one.

For example, if it is expected that the traffic occurrence probability is low based on the information received from the UE (if the inactivity level is high or the expectation value to the traffic arrival time is high, this exemplifies that the inactivity level or expectation value of traffic arrival time is greater than the first threshold value), the RAN releases the RRC connection to reduce the power consumption of the UE and performs the operation for transitioning the RRC connection state of the UE to the idle mode. Otherwise, if it is expected that although there is no traffic occurrence for the time being but the traffic occurrence probability is high (if the inactivity level is low or the expectation value of traffic arrival time is low, this exemplifies that the inactivity level or the expectation value of traffic arrival time is less than the first threshold value), the RAN performs the operation for transitioning the RRC connection state of the UE to the CELL_FACH to mitigate the load of the connection establishment procedure necessary for the traffic expected to occur while reducing the power consumption of the UE.

The above description is exemplified with table 1.

Table 1 maps the inactivity levels and RRC connection state corresponding thereto. In this case, the higher the inactivity level is, the lower the traffic transmission/reception probability is.

If the inactivity level is 3, it is predicted that no traffic transmission/reception occurs for a first duration (e.g. 30 seconds) such that the RAN determines to transition the RRC connection state to the UE idle mode. If the inactivity level is 2, it is predicted that no traffic transmission/reception occurs for a second duration shorter than the first duration (e.g. ⅓ of the first duration or 10 seconds) such that the RAN determines to transition the RRC connection state to the CELL_PCH. If the inactivity level is 1, it is predicted that no traffic transmission/reception occurs for a third duration shorter than the second duration (e.g. ¹/₁₀ of the first duration or 1 second) such that the RAN determines to transition the RRC connection state to the CELL_FACH. For instance, the first threshold value may relate to an inactivity level at which the UE is to be switched to idle mode. In the present case, the first threshold value may have a value of "3" and if the inactivity level is equal or greater than the first threshold value, the UE is switched to idle mode. The first threshold value may additionally or alternatively relate to a duration. Then, the first threshold value may be equal to the above first duration. Now, in the above first case with the inactivity level of "3", the duration is equal to the first duration. That is, the duration is equal (or greater) than the first threshold value and the UE would initiate a transition to idle mode. Further threshold values can be defined which would transit the connection state to CELL_PCH, as in the above second example, or to CELL_FACH, as in the above third example.

TABLE 1

| Inactivity Level | RRC connection state |
|---|---|
| 3 | UE idle mode |
| 2 | CELL_PCH/URA_PCH |
| 1 | CELL_FACH |

The RAN-initiated state transition of the UE can be accomplished using an RRC message. The RAN sends the UE an RRC message for transitioning the RRC state of the UE to a low power state (CELL_FACH, CELL_PCH/URA_PCH, or UE idle mode) consuming less power than the CELL_DCH state.

Figure 8:
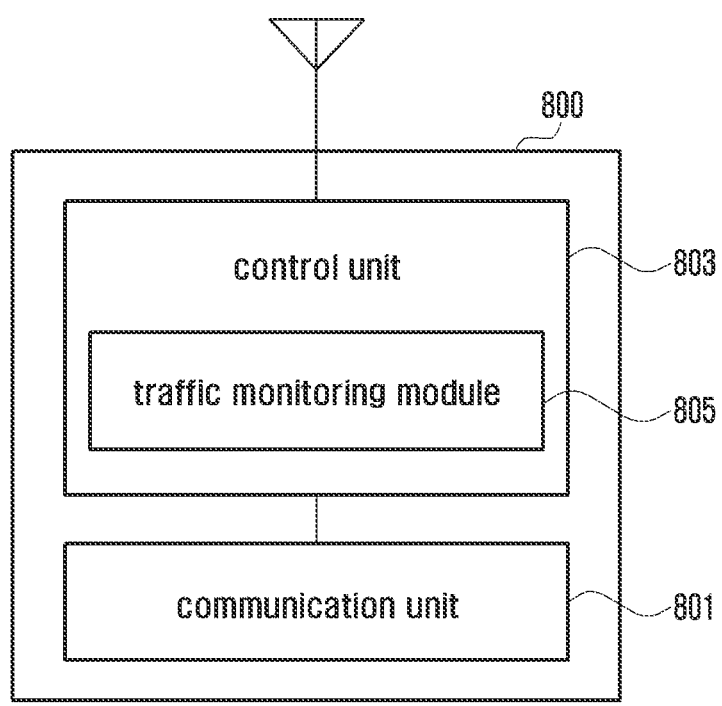
FIG. 8 is a block diagram illustrating a configuration the UE according to an embodiment of the present invention.

FIG. 8 is a block diagram illustrating a configuration the UE according to an embodiment of the present invention.

As shown in FIG. 8, the UE 800 according to an embodiment of the present invention includes a communication unit 801 and a control unit 803. The communication unit 801 is electrically connected to the control unit 803. The control unit 803 may include a traffic monitoring module 805 for monitoring traffic of the UE. The control unit 803 (including the traffic monitoring module 805) may be seen or realized as a higher layer entity to the communication unit 801. In an embodiment of the present invention, the higher layer of the communication unit 801 (including a communication control module) may be called the communication unit (traffic monitoring module).

The communication unit 801 may be responsible for data communication of the UE. The UE may communicate signals with the eNB by means of the communication unit 801. In an embodiment of the present invention, the term 'communication unit' is interchangeably used with the terms 'communication module' and 'communication control module.'

The control unit 803 controls the overall operation of the UE 800 including the communication unit 801. In the present invention, the terms 'control unit,' 'traffic monitoring module', and 'traffic monitoring control module' are interchangeably used in the same meaning for the explanation convenience.

Although the UE 800 is depicted with only the communication unit 801 and the control unit 803 in FIG. 8 for the convenience purpose, it is obvious to those skilled in the art that the function units may be divided into various modules or integrated into one module depending on the operation and function of the UE.

The control unit 803 may determine whether any traffic to be transmitted occurs at the UE during a period predetermined by the timer included in the control message received from the RAN, and if no traffic occurs, transmits the Signaling Connection Release Indication (SCRI) message to the RAN and changes the RRC connection state of the UE according to the response transmitted by the RAN in response to the SCRI message.

The control unit 803 collects the traffic occurrence pattern based on the traffic transmission/reception status of the application running on the UE and determines whether any traffic to be transmitted by the UE occurs based on the collected pattern.

The control unit 803 starts a timer at the last data transmission/reception time of the application and, if no further data transmission/reception occurs before the expiry of the timer, determines that no traffic occurs.

If the traffic transmission/reception interval of the application is longer than a predetermined threshold, the control unit 803 may determine that no traffic occurs.

The control unit 803 may determine the inactivity level of the UE based on the traffic occurrence probability of the application estimated from the collected traffic pattern, and the SCRI message may include the information for determining the inactivity level of the UE. According to an embodiment of the present invention, the SCRI message may include the information of the expectation value to the next traffic transmission/reception time or interval.

The control unit 803 may further determine whether the SCRI message transmission condition is fulfilled based on at least one of RRC connection state, whether being connected to the CS domain, DRX configuration parameter of the UE, and whether a timer for SCRI message transmission is running.

According to an embodiment of the present invention, the control unit 803 may monitor the traffic transmission/reception state of at least one application running on the UE. The control unit 803 may determine whether traffic for the UE occurs based on the monitoring result. If it is determined that no traffic occurs for the UE, the control unit 803 may control to transmit the Signaling Connection Release Indication (SCRI) message to the RAN.

Although the description is directed to the case where the control unit 803 monitors the traffic transmission/reception state, the traffic may be monitored by the traffic monitoring module 805.

Figure 9:
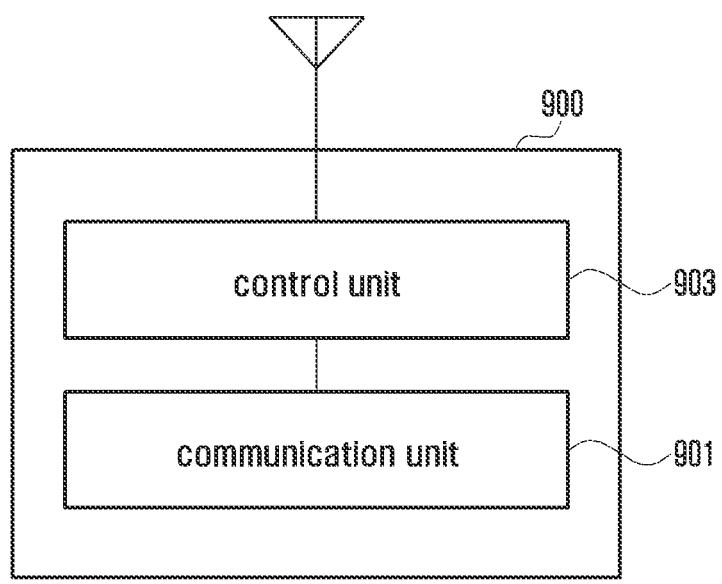
FIG. 9 is a block diagram illustrating a configuration of the RAN according to an embodiment of the present invention.

FIG. 9 is a block diagram illustrating a configuration of the RAN (or RAN) according to an embodiment of the present invention.

As shown in FIG. 9, the RAN 900 is a network control node equipped with the communication function such a radio network, a radio network node, a base station, and an RAN. Although the RAN 900 is depicted with only the communication unit 901 and the control unit 903 for explanation convenience, it is obvious to those skilled in the art that the function units can be divided into various modules or integrated into one module.

The communication unit 901 is responsible for data communication with the UE. The communication unit 901 is electrically connected to the control unit 903. The RAN may transmit/receive signals to and from the UE by means of the communication unit. In the present invention, the terms 'communication unit,' 'communication module,' and 'communication control module' are used interchangeably in the same meaning for explanation convenience.

The control unit 903 controls the overall operation of the RAN 900 including the communication unit 901.

The control unit 903 receives the Signaling Connection Release Indication (SCRI) message from the UE, determines the RRC connected mode of the UE based on the UE traffic occurrence-related information included in the SCRI message, and sends the UE the RRC message instructing to transition the RRC connection state to the determined RRC connected mode or to UE idle mode.

If the inactivity level is greater than a predetermined threshold level, the control unit 903 may shift the RRC connection state of the UE to a low power consumption state.

If the expectation value is greater than a predetermined threshold value, the control unit 903 may shift the RRC connection state of the UE to a low power consumption state.

According to an embodiment of the present invention, the control unit 903 may receive the Signaling Connection Release Indication (SCRI) message including the traffic occurrence-related information from the UE. The control unit 903 also may determine the necessity of UE state transition based on the traffic occurrence-related information and, if necessary, to generate a control message for RRC connection state transition. The control unit 903 may also transmit the control message to the UE.

Although the RAN 900 is depicted with only the communication unit 901 and the control unit 903 in FIG. 9 for the convenience purpose, it is obvious to those skilled in the art that the function units may be divided into various modules or integrated into one module depending on the operation and function of the RAN.

In the embodiments of the present invention, the traffic monitoring unit 805 may be a module of monitoring the traffic status of various application services running on the UE and synchronizing the operations based thereon, e.g. application synchronizer.

In various embodiments of the present invention, in order to predict the next traffic (or packet) occurrence for the UE (hereinafter, the terms 'occurrence' and 'arrival' are used in the same meaning), a probability distribution can be used. The traffic monitoring unit of the UE measures the time of traffic occurrence whenever the traffic (or packet) occurs and calculates the statistical distribution of the arrival times of the traffic (or packet) based thereon.

In an embodiment of the present invention, calculating a statistical distribution may be calculating an average and a standard deviation. In an embodiment of the present invention, calculating the statistical distribution of the traffic (or packet) arrival times may be calculating the statistical distribution of the inter-arrival periods of the traffic (or of packets). In an embodiment of the present invention, calculating the statistical distribution of the arrival times of the traffic (or packet) is calculating the arrival rate y which is expressed as the number of traffic (or packets) n occurring in a predetermined period (T), i.e. n/T. Such statistical distributions are calculated in a predetermined period counted back from the current time, with a predetermined number of samples, or with a predetermined number of most recent samples.

That is, the traffic (or packet) occurrence monitoring window for calculating the statistical distributions moves. The window size is configurable.

The traffic (or packet) arrival time monitoring and statistical distribution calculation may be performed to all the traffic of the UE per service application, PDN connection (PDP context), or IP flow. In an embodiment of the present invention, the traffic (or packets) arrival time monitoring and statistical distribution calculation thereof can be performed for some traffic (or packets) selectively.

In an embodiment of the present invention, the traffic (or packets) arrival time monitoring and statistical distribution calculation of the arrival time is performed for respective uplink traffic and downlink traffic. In the case that the synchronization function is applied to the traffic (packets) at the UE, the statistical distribution calculation of the traffic (packets) arrival times may be applied to the traffic (or packets) according to the result of the application of the synchronization function.

In an embodiment of the present invention, when calculating the statistical distribution, it may be assumed that the traffic (or packets) occurrence process follows a Poisson arrival process. In an embodiment of the present invention, when calculating the statistical distribution, it may be assumed that the traffic (or packet) occurrence time interval follows an exponential distribution.

If traffic (or packet) occurs (is transmitted or received), the traffic monitoring module of the UE determines that no traffic (or packet) is occurring when the probability of m occurrences of the next traffic (or packet) is lower than P during a predetermined period (t) according to the statistical distribution of the predetermined traffic (or packet) arrival time.

The next traffic occurrence probability P may be calculated using equation (1).

$$P = \frac{(\gamma t)^m}{m!} \exp(-\gamma t) \quad (1)$$

The UE calculates P using equation (1), compares P with a predetermined threshold p, and determines, if P is less than (or not greater than) p, that the traffic (or packet) occurrence probability is low. When calculating P using equation (1), the integer m may be set to 1. According to the determination result, the UE may determine the end of the PS data session and perform an operation for RRC connection state transition, i.e. transmit the SCRI message. This process can be implemented in such a way that the higher layer (traffic monitoring module) notifies the lower layer (communication control module) of the completion of data transmission/reception of the UE or necessity of releasing the RRC connection.

As described above, the embodiments of the present invention are applicable to the UE connecting to a non-3G (UTRAN) such as LTE (E-UTRAN). In the case that the embodiments of the present invention is applied to the UE connecting to the LTE network, the operation execution layers may be changed (e.g. instead of the RRC entity, a NAS entity may transmit the connection state transition request message), the request message is changed (e.g. UE Assistance Information message or RRC Release Request message is used instead of SCRI message on RRC layer), or at least one step/operation is omitted or the order of the steps is changed.

In the case of using the E-UTRAN, the UE sends the RAN a connection state transition request message. This operation is performed when the higher layer (traffic monitoring module or non-access stratum NAS layer) sends the communication control module (RRC layer) the information notifying of at least one of traffic transmission/reception completion, PS data session termination, user inactivity, and RRC connection release necessity.

Whether to notify of at least one of the above informations is determined as described in the embodiments of the present invention. The request message may be the UE Assistance Information message which may include at least one of the informations notifying of the traffic transmission/reception completion, PS data session termination, RRC connection release necessity, user inactivity, and/or low power consumption necessity.

If a message including the above information is received from the UE, the RAN may perform the operation of releasing the RRC connection of the UE, i.e. transmitting a RRC connection release message to the UE and transmitting a UE context release request message to the mobility management entity (MME). Meanwhile, the UE Assistance Information may be substituted by the RRC connection release request message.

The information may be included in a header or a control element used in transmitting user plane data at the UE other than a separate control message. The eNB may postpone the operation of releasing the RRC connection until the user plane data communication ends.

In an alternative embodiment, the UE connected to the E-UTRAN may transmit the connected mode transition request message to the MME. In various embodiments, this operation is performed when at least one of the followings is notified to the communication control module (NAS layer): traffic transmission/reception completion, PS data session termination, user inactivity, and/or RRC connection release necessity.

Whether to notify of at least one of the above informations is determined as described in the embodiments of the present invention. The request message may be the NAS message which may include at least one of the informations notifying of the traffic transmission/reception completion, PS data session termination, RRC connection release necessity, user inactivity, and/or low power consumption necessity.

In an embodiment of the present invention, the NAS message may be an Evolved Packet System Mobility Management (EMM) status message with an EMM Cause Information Element including the informations notifying of the traffic transmission/reception completion, PS data session termination, RRC connection release necessity, user inactivity, and/or low power consumption necessity.

If a NAS message including the above information is received from the UE, the MME may perform the operation of releasing the RRC connection of the UE. If RRC connection of the UE is released, this means that the MME releases the logical connection established with the UE and, for this purpose, the MME may transmit a UE context release command message. This message may include one of the informations notifying of the traffic communication termination caused by connection release, PS data session termination, RRC connection release necessity, user inactivity, and/or low power consumption requirement.

If the UE context release command message is received from the MME, the eNB performs the operation of releasing the RRC connection to the UE. If the message received from the eNB includes one of the informations notifying of the traffic communication termination caused by connection release, PS data session termination, RRC connection release necessity, user inactivity, and/or low power consumption requirement; the eNB waits until the user plane data communication with the UE is completed and then perform the operation of releasing the RRC connection.

As described above, the state transition method and apparatus of a terminal according to the present invention is advantageous in terms of minimizing battery consumption of the terminal in such a way a traffic pattern analysis module of the terminal provides the information for changing the state of the communication module dynamically according to the traffic pattern between the network and terminal.

It is to be appreciated that those skilled in the art can change or modify the embodiments without departing the technical concept of this invention. Accordingly, it should be understood that above-described embodiments are essentially for illustrative purpose only but not in any way for restriction thereto. Thus the scope of the invention should be determined by the appended claims and their legal equivalents rather than the specification, and various alterations and modifications within the definition and scope of the claims are included in the claims.

Although preferred embodiments of the invention have been described using specific terms, the specification and drawings are to be regarded in an illustrative rather than a restrictive sense in order to help understand the present invention. It is obvious to those skilled in the art that various modifications and changes can be made thereto without departing from the scope of the invention as set forth in the claims.

What is claimed is:

1. A terminal for controlling a state of the terminal in a wireless communication system, the terminal comprising:
a transceiver configured to transmit and receive signals to and from a base station; and
at least one processor electrically connected to the transceiver and configured to:
monitor a plurality of traffic transmissions/receptions associated with a plurality of applications executed on the terminal,
identify information indicating an inactivity level of the terminal and a traffic transmission/reception pattern based on the monitored plurality of traffic transmissions/receptions associated with the plurality of applications, the traffic transmission/reception pattern being identified based on periods associated with the plurality of traffic transmissions/receptions corresponding to the plurality of applications,
determine whether a traffic is predicted to not occur for a predetermined duration based on the traffic transmission/reception pattern,
evaluate, if the traffic is predicted to not occur for the predetermined duration, at least one of conditions for determining whether it is possible to
transmit a signaling connection release indication (SCRI) message, transmit the SCRI message including the information indicating the inactivity level of the terminal based on the evaluated conditions to the base station, and
receive a Radio Resource Control (RRC) message for transitioning the RRC connection state of the terminal,
wherein the RRC connection state of the terminal is determined, if the information indicating the inactivity level of the terminal is:
equal to or greater than a first threshold value, to transition the state of the terminal to UE idle mode, or
less than the first threshold value, to transition the state of the terminal to one of CELL_PCH and CELL_FACH, and
wherein the conditions are based on at least one of current operating state, connection to a circuit switched (CS) domain, discontinuous reception (DRX) configuration parameter, timer for use in RRC connection control and variable for use in the RRC connection control.

2. The terminal of claim 1, wherein the at least one processor is further configured to determine, if traffic end indication information is detected, that the traffic is predicted to not occur for the predetermined duration.

3. The terminal of claim 1, wherein the at least one processor is further configured to determine, if traffic end indication information and traffic transmission/reception occurrence information are detected, that the traffic is predicted to not occur for the predetermined duration.

4. The terminal of claim 1, wherein the at least one processor is further configured to:
receive a message for transitioning a state of the terminal from the base station, and
transition the state of the terminal based on the received message.

5. The terminal of claim 1, wherein the at least one processor is further configured to transition the state of the terminal after transmitting the SCRI message.

6. The terminal of claim 1, wherein the at least one processor is further configured to:
determine whether T323 timer is received from the base station, and
transmit, if the T323 timer is received, the SCRI message to the base station.

7. The terminal of claim 1, wherein traffic occurrence-related information comprises at least one of expectation information on time duration between last traffic transmission/reception and a next traffic transmission/reception or a level information of time before the next traffic transmission/reception.

8. A connection state control method of a terminal in a wireless communication system, the method comprising:
monitoring a plurality of traffic transmissions/receptions associated with a plurality of applications executed on the terminal;
identifying information indicating an inactivity level of the terminal and a traffic transmission/reception pattern based on the monitored plurality of traffic transmissions/receptions associated with the plurality of applications, the traffic transmission/reception pattern being identified based on periods associated with the plurality of traffic transmissions/receptions corresponding to the plurality of applications;
determining whether a traffic is predicted to not occur for a predetermined duration based on the traffic transmission/reception pattern;
evaluating, if the traffic is predicted to not occur for the predetermined duration, at least one of conditions for determining whether it is possible to transmit a signaling connection release indication (SCRI) message;
transmitting the SCRI message including information indicating an inactivity level of the terminal based on the evaluated conditions to the base station, and
receiving a Radio Resource Control (RRC) message for transitioning the RRC connection state of the terminal,
wherein the RRC connection state of the terminal is determined if the information indicating the inactivity level of the terminal is:
equal to or greater than a first threshold value, to transition the state of the terminal to UE idle mode, or
less than the first threshold value, to transition the state of the terminal to one of CELL_PCH and CELL_FACH, and
wherein the conditions are based on at least one of current operating state, connection to a circuit switched (CS)_domain, discontinuous reception (DRX) configuration parameter, timer for use in RRC connection control and variable for use in the RRC connection control.

9. The method of claim 8, wherein determining comprises determining that the traffic is predicted to not occur for the predetermined duration if traffic end indication information is detected.

10. The method of claim 8,
wherein determining comprises determining that the traffic is predicted to not occur for the predetermined duration if traffic end indication information and traffic transmission/reception occurrence information are detected, and
wherein the traffic occurrence-related information comprises at least one of expectation information on time duration between last traffic transmission/reception and next traffic transmission/reception or a level information of time before the next traffic transmission/reception.

11. The method of claim 8, further comprising:
receiving a message for transitioning state of the terminal from the base station; and
transitioning the state of the terminal based on the received message,
wherein transmitting the SCRI message comprises:
determining whether T323 timer is received from the base station, and
transmitting, when the T323 timer is received, the SCRI message to the base station, and
wherein the connection state of the terminal comprises at least one of a user equipment (UE) idle mode, a radio resource control (RRC) connected mode, a CELL_PCH state, a CELL_FACH state, and a CELL_DCH state.

* * * * *